(12) United States Patent
Fortin

(10) Patent No.: US 12,298,607 B2
(45) Date of Patent: May 13, 2025

(54) VARIABLE TRANSMITTANCE SUNGLASSES COMPRISING A LIGHT DETECTOR AND A LIGHT PROCESSING COMPONENT

(71) Applicant: Manuel Fortin, Notre-Dame-de-l'Ile-Perrot (CA)

(72) Inventor: Manuel Fortin, Notre-Dame-de-l'Ile-Perrot (CA)

( * ) Notice: Subject to any disclaimer, the term of this patent is extended or adjusted under 35 U.S.C. 154(b) by 235 days.

(21) Appl. No.: 18/054,378

(22) Filed: Nov. 10, 2022

(65) Prior Publication Data

US 2024/0160046 A1 May 16, 2024

Related U.S. Application Data

(60) Provisional application No. 63/283,411, filed on Nov. 26, 2021.

(51) Int. Cl.
*G02C 7/10* (2006.01)
*G02C 11/00* (2006.01)
*G02F 1/133* (2006.01)

(52) U.S. Cl.
CPC .............. *G02C 7/101* (2013.01); *G02C 11/10* (2013.01); *G02F 1/13318* (2013.01)

(58) Field of Classification Search
None
See application file for complete search history.

(56) References Cited

U.S. PATENT DOCUMENTS 8,081,262 B1 * 12/2011 Perez .................... G02F 1/1347
349/13

FOREIGN PATENT DOCUMENTS

FR         2530039 A1 *  1/1984
JP     H08114822 A  *  5/1996

OTHER PUBLICATIONS

Huang, James, "Solar-powered sunglasses_POC Aspire Solar Switch review", "CyclingTips", Apr. 2020, printed from https://cyclingtips.com/2020/04/poc-aspire-solar-switch-review/ on Nov. 10, 2022.

* cited by examiner

*Primary Examiner* — Paul C Lee

(57) ABSTRACT

Sunglasses wearable by an intended user in presence of the sun, the sunglasses comprising: a lens support wearable by the intended user and defining a sight direction relative thereto; a pair of sunglasses lenses mounted to the lens support, the sunglasses lenses having an adjustable transmittance and being selectively configurable between least and most transmitting states, wherein the sunglasses lenses transmit more visible light in the most transmitting state than in the least transmitting state; and a controller operatively coupled to the sunglasses lenses for selectively changing the transmittance, the controller being operative for changing the transmittance as a function of a sun-to-sight angle between the sun and the sight direction.

10 Claims, 4 Drawing Sheets

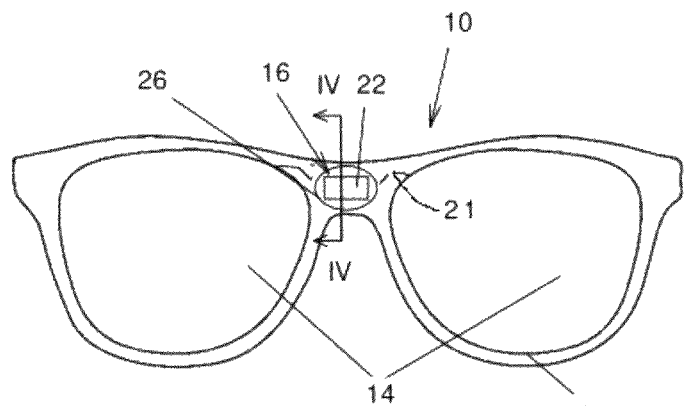 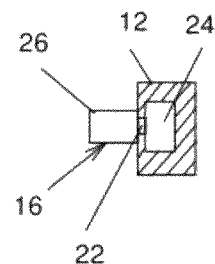
FIG. 3      FIG. 4
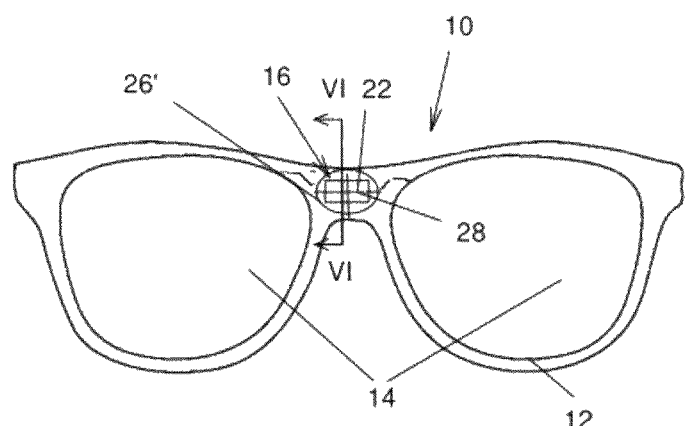 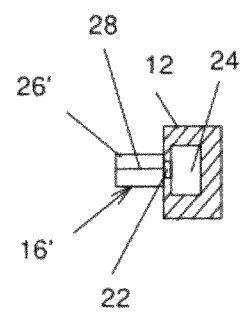
FIG. 5      FIG. 6
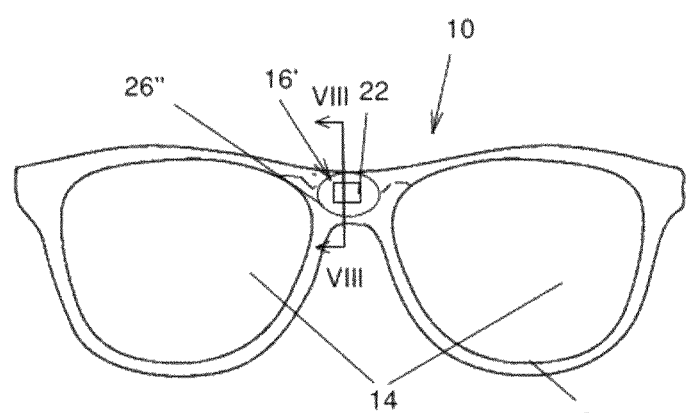 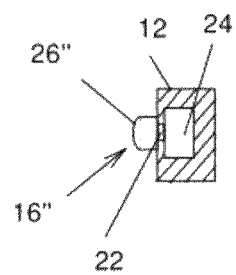
FIG. 7      FIG. 8

VARIABLE TRANSMITTANCE SUNGLASSES COMPRISING A LIGHT DETECTOR AND A LIGHT PROCESSING COMPONENT

FIELD OF THE INVENTION

The present invention relates to the general field of sunglasses and is particularly concerned with variable transmittance sunglasses.

BACKGROUND

Some sports that are played outdoors require tracking of an object, such as a ball, before catching or hitting the latter. A non-limiting example of such a sport is tennis. It often happens in sunny conditions that the ball is seen to be relatively close to the sun for a given player. If the ball gets too close to the sun in the field of view of this player, it can become very difficult for the player to accurately track the ball. This can be the case, for example, when serving or when returning a lob.

Many strategies have been used to try to mitigate this situation. One strategy is to wear a cap. The cap will block the sun over most of the field of view of the player without affecting the player's ability to clearly see the ball. However, if the ball is very close to the sun, the player will need to tilt his head in the direction of the ball to see the ball, and the sun will get close to the center of the field of view of the player. The cap will then be ineffective. The player may be able to track the ball and hit a shot in such hard conditions, but this will result in a contracted pupil and photo-bleaching, which will greatly reduce the ability of the player to track the ball after that shot. This is extremely problematic when serving in tennis, as for skilled players, the serve is the fastest shot. It can thus be hit by the returner very soon after being hit by the server, and the server's photoreceptors would then not have had the time to get back to their normal sensitivity. The ball then becomes very difficult to see, which greatly reduces the server's ability to play the point.

Another strategy is to use sunglasses. Some sunglasses can be dark enough that one can serve with the ball only a few degrees away from the sun in the field of view of the server. However, dark sunglasses also reduce the quantity of light that reaches the eyes when looking away from the sun. This reduces the ability of the player to follow the ball as contrast between the ball and the environment is reduced. Since the modern game of tennis is extremely rapid, any small reduction in information that reaches the eyes of the player can cause a non-negligible reduction in player ability, even a moderately high level.

Yet another strategy is to use one's hands to block the sun while making the shot. This however will completely change the biomechanics of the shot, and often results in a weaker, slower and less precises shot, which is obviously highly disadvantageous.

Accordingly, there exists a need for methods and devices for assisting in tracking an object that may occasionally move close to the sun in a field of view of a player. It is a general objective of the present invention to provide such methods and devices.

SUMMARY OF THE INVENTION

In a broad aspect, there are provided sunglasses wearable by an intended user in presence of the sun, the sunglasses comprising: a lens support wearable by the intended user and defining sight direction relative thereto; a pair of sunglasses lenses mounted to the lens support, the sunglasses lenses having an adjustable transmittance and being selectively configurable between least and most transmitting states, wherein the sunglasses lenses transmit more visible light in the most transmitting state than in the least transmitting state; and a controller operatively coupled to the sunglasses lenses for selectively changing the transmittance, the controller being operative for changing the transmittance as a function of a sun-to-sight angle between the sun and the sight direction.

Advantageously, darkening the sunglasses to the least transmitting state when the sight direction to track object traveling through air closes on the sun allows the intended user to track the object at smaller sun-to-sight angle than if the sunglasses remained in the most transmitting state. Conversely, when looking away from the sun, the sunglasses revert to the least transmitting state, or at least to a state in which the sunglasses transmit much more light than in the least transmitting state, which again facilitates tracking of the object. Typically, this transition is relatively fast and abrupt as a function of the sight-to-sun angle.

The sunglasses would also be usable in other contexts, such as when driving.

There may also be provided sunglasses wherein the sunglasses lenses are in the least transmitting state when the sun-to-sight angle is smaller than a predetermined angle, and wherein the sunglasses lenses are clearer than in the least transmitting state when the sun-to-sight angle is larger than the predetermined angle.

There may also be provided sunglasses wherein the controller includes a light detector and a light processing component, the light processing component being operative for only allowing light incoming over a predetermined admittance solid angle to reach the light detector, the predetermined admittance solid angle being smaller than a human field of view; and the controller is operative for darkening the sunglasses lenses when an irradiance of light reaching the light detector is above a predetermined irradiance.

There may also be provided sunglasses wherein the light detector includes a photovoltaic cell.

There may also be provided sunglasses wherein the sunglasses lenses include one of a liquid crystal film and an electrochromic material, the one of the liquid crystal film and electrochromic material darkening when a voltage is applied thereacross by the photovoltaic cell.

There may also be provided sunglasses wherein the controller is powered by the photovoltaic cell.

There may also be provided sunglasses wherein the light processing component includes a shade for preventing light rays outside of the predetermined admittance solid angle from reaching the light detector.

There may also be provided sunglasses wherein the shade is removably mounted to the lens support.

There may also be provided sunglasses wherein the light processing component includes a processing lens for preventing light rays outside of the predetermined admittance solid angle from reaching the light detector.

There may also be provided sunglasses wherein the admittance solid angle measures from about 0.03 to about 0.37 steradians.

There may also be provided sunglasses wherein the lens support is a frame supporting the sunglasses lenses.

There may also be provided sunglasses wherein the admittance solid angle is a minor portion of a field of view of the intended user.

There may also be provided sunglasses wherein when the sunglasses are gradually tilted towards the sun, the transmittance is reduced by a factor of 2 or more over a change in orientation of less than 5 degrees.

In another broad aspect, there is provided a method for automatically darkening sunglasses lenses of sunglasses when the head of an intended user of the sunglasses is oriented within a predetermined angular region relative to the sun, the method comprising: preventing light rays coming from outside a predetermined solid angle from reaching a light detector; receiving light at the light detector; and darkening the sunglasses lenses from a clearer state to a darker state when an irradiance of the light received at the light detector is above a predetermined irradiance; wherein the sunglasses automatically darken when the sun is inside the predetermined solid angle centered on a center of the detector relative to a perpendicular to the light detector.

There may also be provided a method wherein the predetermined solid angle measures from about 0.03 to about 0.37 steradians.

There may also be provided a method wherein darkening the sunglasses lenses includes darkening a liquid crystal film covering the sunglasses lenses.

There may also be provided a method wherein preventing light rays coming from outside the predetermined solid angle from reaching a light detector includes blocking the light rays coming from outside the predetermined solid angle.

There may also be provided a method wherein preventing light rays coming from outside the predetermined solid angle from reaching a light detector includes deviating the light rays coming from outside the predetermined solid angle to a region outside of the light detector.

There may also be provided a method further comprising wearing a cap to shade a top portion of a field of view of an intended user.

In another broad aspect, there is provided a method of playing a sport, the method comprising: tracking an object moving through air while wearing sunglasses; and upon movements of the head required to track the object resulting in the sunglasses facing within a predetermined solid angle centered on the sun, reducing a transmittance of the sunglasses.

Advantageously, the sunglasses absorb more light when a user wearing the sunglasses looks close to the sun, allowing one to better see objects, such as a tennis ball, in such conditions with reduced or no photobleaching, while absorbing less light when looking away from the sun to allow better tracking of the ball in these latter conditions.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the drawings:

FIG. 3, in a front elevation view, illustrates sunglasses in accordance with an embodiment of the present invention;

FIG. 4, in a cross-sectional view along line IV-IV of FIG. 3, illustrates the sunglasses of FIG. 3;

FIG. 5, in a front elevation view, illustrates sunglasses in accordance with an alternative embodiment of the present invention;

FIG. 6, in a cross-sectional view along line VI-VI of FIG. 5, illustrates the sunglasses of FIG. 5;

FIG. 7, in a front elevation view, illustrates sunglasses in accordance with an other alternative embodiment of the present invention;

FIG. 8, in a cross-sectional view along line VIII-VIII of FIG. 7, illustrates the sunglasses of FIG. 7;

DETAILED DESCRIPTION

Figure 1:
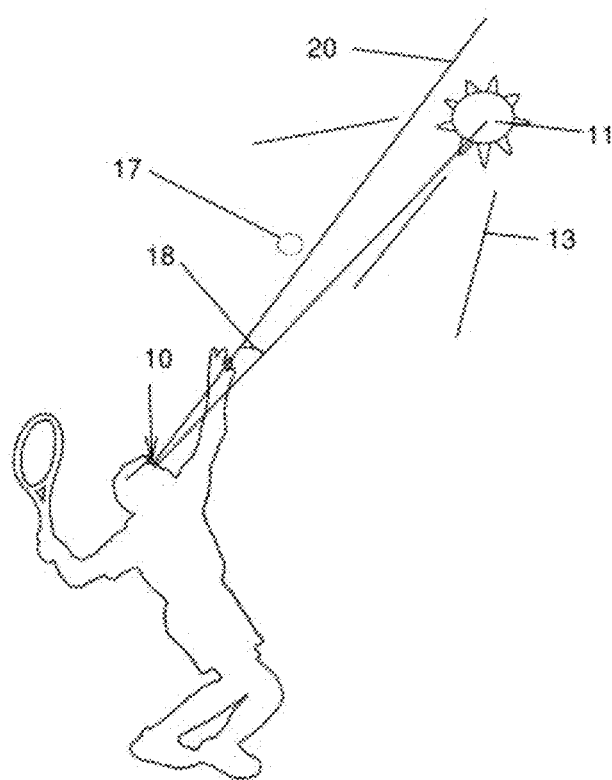
FIG. 1, in a schematic view, illustrates an intended user of sunglasses in the form of a tennis player, the intended user being shown herein in the process of serving.
Figure 2:
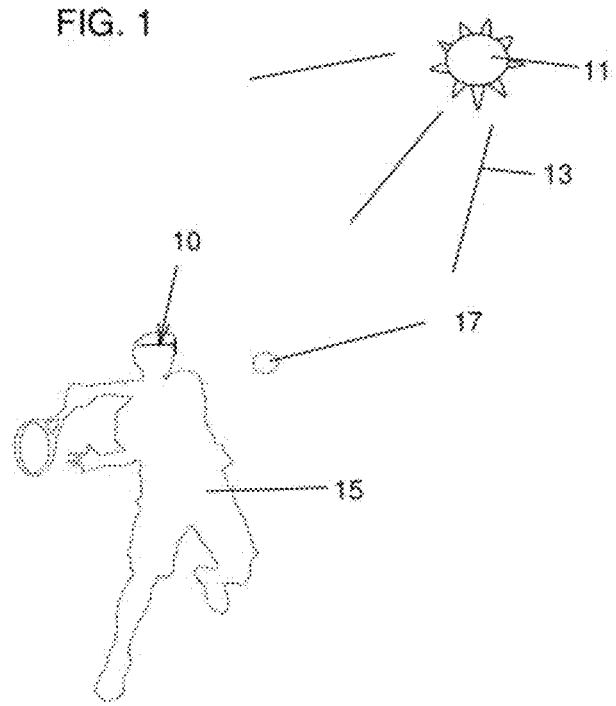
FIG. 2, in a schematic view, the intended user in the process of hitting a ground stroke.

Collectively referring to FIGS. 1 and 2, there is shown an intended user 15 wearing sunglasses 10 usable to partially absorb, reflect, or both absorb and reflect sunlight 13 emitted by the sun 11. FIG. 1 illustrates the intended user 15 looking up, in a direction that is close to a direction pointing towards the sun 11, for example to see a ball 17 that has been tossed to perform a tennis serve. FIG. 2 illustrates the intended user looking horizontally, in a direction that is far from the direction pointing towards the sun 11, for example to hit a ground stroke in tennis. Due to the eye's admittance angle and sensitivity, if unprotected, the intended user of FIG. 1 would have difficulty clearly seeing the ball 17, or at least would have a temporary reduction in light sensitivity in his eyes after looking at the ball 17 and then looking away from the sun 11. The intended user 15 in FIG. 2, however, could play the ball 17 without suffering from these disadvantages. The intended user 15 in FIG. 2 could in addition wear a cap, which would completely remove the sun 11 from his field of view. However, if dark sunglasses were worn by the intended user of FIG. 2, less information regarding the position, speed and spin of the ball 17 would be processed in the same amount of time compared to the case in which no sunglasses are worn. The sunglasses 10 of the present invention aim at mitigating the disadvantages mentioned in this paragraph by being selectively darkened when the intended user's sight gets too close to the sun 11 direction.

While the example of tennis is used in this document, the present sunglasses are usable in any other sports wherein one needs to track an object travelling through air, as in the case in many sports. Generally speaking, the intended user 15 wearing the proposed sunglasses 10 can track the object, such at the ball 17, and upon movements of the head of the intended user required to track the projectile resulting in the sunglasses 10 facing within a predetermined solid angle centered on the sun 11 the sunglasses 10 change to a state of reduced transmittance. Non-limiting example of such sports include tennis, beach volleyball and ultimate frisbee, among others. If desired, the intended user 15 may further elect to wear a cap so further block the sun. The predetermined solid angle is typically much smaller than the field of view of the intended user, so that the sunglasses 10 are darker only when the sun is close to the center of the field of view of the intended user 15. A typical human field of view is about 114 degrees by 180 degrees. Typically, the predetermined solid angle extends from 10 to 60 degrees by 10 to 60 degrees, for example 40 by 40 degrees.

The sunglasses 10 include a lens support, a pair of sunglasses lenses 14 mounted to the lens support, and a controller 16. For example, the lens support takes the form of a frame 12 supporting a pair of sunglasses lenses 14. The frame 12 may surround completely the sunglasses lenses 14, as seen in FIG. 3, or only part thereof. In alternative embodiments, the sunglasses 10 may be frameless sunglasses, and the lend support includes side arms and a bridge mounted to the sunglasses lenses 14, which cooperatively allow the intended user 15 to wear the sunglasses 10. The lens support defines a sight direction 20, corresponding generally to a direction towards which the face of the intended user 15 faces when the sunglasses 10 are worn. Typically, the sight direction is about perpendicular to the lenses 14, as seen in FIG. 1 for example.

The sunglasses lenses 14 have an adjustable transmittance and are selectively configurable between least and most transmitting states. The sunglasses lenses transmit more visible light in the most transmitting state than in the least transmitting state. The controller 16 is operatively coupled to the sunglasses lenses 14 for selectively changing the transmittance. The controller 16 is operative for changing the transmittance as a function of a sun-to-sight angle 18 between the sun 11 and the sight direction 20. Typically, when the sun-to-sight angle 18 is relatively small, the lenses 14 are in the least transmitting state, and when the sun-to-sight angle 18 is relatively large, the sunglasses lenses 14 are in the most transmitting state. The sight direction 20 is indicative of a typical direction in which the intended user 15 looks, with neutral eye orientation relative to the face. Thus, the sunglasses lenses 14 darken when the sun 11 is close to the center of the intended user's 15 field of view and become clearer otherwise. The light that is not transmitted may be absorbed, reflected, or both absorbed and reflected by the sunglasses lenses 14.

The sunglasses lenses 14 are such that an electrical signal may affect their transmittance. For example, the sunglasses lenses 14 incorporate an electrochromic material or a liquid crystal layer. In both cases, when a predetermined voltage is applied in a suitable way across the electrochromic material or the liquid crystal, the lenses 14 darken. In the absence of the voltage, the lenses 14 are either transparent or absorb light to a smaller extent than when the voltage is applied. The voltage may be applied using one or more batteries. In other embodiments, the voltage is applied using a photovoltaic cell. The lenses 14 may present a gradual darkening as a function of voltage, operating in an analog manner, of the lenses 14 may present a sudden darkening as a function of voltage, operating in a digital manner. In a specific embodiment of the invention, the lenses 14 absorb between 0 and 20 percent of the light in the least absorbing state, and between 70 and 95 percent of the light in the most absorbing state, but other absorption values are within the scope of the invention.

Referring collectively to FIGS. 3 and 4, the controller 16 is operative for applying the predetermined voltage, through electrical conductors 21 extending between the controller 16 and the sunglasses lenses 14, when the sun-to-sight angle 18 is below a predetermined angle. Thus, the sunglasses lenses 14 are in the least transmitting state when the sun-to-sight angle 18 is smaller than the predetermined angle, and the sunglasses lenses are clearer than in the least transmitting state when the sun-to-sight angle 18 is larger than the predetermined angle. In some embodiments, the sunglasses lenses 14 require the sun 11 to have an irradiance above a predetermined irradiance before darkening. Indeed, the sun may be dimmed by clouds, fogs, or simply by being low on the horizon, and as such being dimmed by a relatively large amount of atmosphere. In such cases, the sunglasses 10 may remain in their least absorbing state without altering the intended user's 15 vision, even when looking close to the sun 11. In some embodiments, the predetermined irradiance is one of 10, 50, 100 or 200 W/m^2.

The controller 16 includes a light detector and a light processing component. The light processing component is operative for only allowing light incoming over a predetermined admittance solid angle to reach the light detector. The controller 16 is operative for darkening the sunglasses lenses 14 when an irradiance of light reaching the light detector is above a predetermined irradiance.

In one embodiment, the light detector is a photovoltaic cell 22. In some embodiments, the photovoltaic cell 22 is of an area sufficient to power the sunglasses lenses 14 when the irradiance of the sun's light received at the photovoltaic cell 22 is above a predetermined threshold so that the lenses 14 are in the least transmitting state. In this embodiment, the photovoltaic cell 22 serves both as a power source for the lenses 14 and as a detector for the sun-to-sight angle 18. If required, additional electronic components 24 are used in the controller 16 to match the current and voltage provided by the photovoltaic cell 22 to the requirements of the lenses 14 or to provide additional logic to the controller 16. For example, and non-limitingly, an on/off switch could be used so that the lenses are permanently in either the most transmissing state or the least transmitting state when the switch is in a predetermined state (open or closed). When the switch is in the other state, the adaptive nature of the sunglasses 10 is enabled.

In some embodiments, the light processing component includes a shade 26 for preventing light rays outside of the predetermined admittance solid angle from reaching the light detector, for example the photovoltaic cell 22. In other words, the shade 26 prevents sunlight from directly reaching the photovoltaic cell 22 unless the sun-to-sight angle 18 is small enough to negatively affect a typical user's vision. The shade 26 may be in the form of a single elongated tube extending from the frame 12 with the photovoltaic cell 22 being provided at the end of the tube opposed to its free end. When the sun 11 is too far away from the axis of the tube, no sunlight can reach the photovoltaic cell 22 directly. If the power provided by the photovoltaic cell 22 is too small to power the lenses 14 with indirect light, the lenses 14 will then remain in their most transmitting state. The shade 26 typically extends along the predetermined sight direction 20.

In other embodiments, as seen in FIGS. 5 and 6, the controller 16' includes a shade 26' divided by walls 28 extending parallel to a longitudinal axis of the tube forming the outer wall of the shade 26'. Subdividing the shade 26' allows to use a shade 26' that is shorter than the shades 26. The shades 26 and 26' therefore ensure that darkening occurs only when the sun 11 is close enough to a center of the field of view of the intended user 15, as no light reaches the photovoltaic cell 22 directly when this angle is large enough, due to geometric constraints created by the shade 26 and 26' and the walls 28 when present.

In yet other embodiments, as seen collectively in FIGS. 7 and 8, the light processing component includes a processing lens for preventing light rays outside of the predetermined admittance solid angle from reaching the light detector. For example, a controller 16" includes a converging lens 26" that supplements or replaces the shades 26 or 26'. If the photovoltaic cell 22 is smaller than the processing lens 26", rays coming from the sun 11 will be deviated besides the photovoltaic cell 22 when the sun-to-sight angle 18 becomes large enough. In such embodiments, it may be advantageous to locate the photovoltaic cell 22 outside of the focus of the lens 26" to preserve the integrity of the photovoltaic cell 22 as focusing the sun's 11 rays may damage the latter. The lens 26" may be a conventional lens, with a convex face facing outside, or a Fresnel lens.

Figure 9:
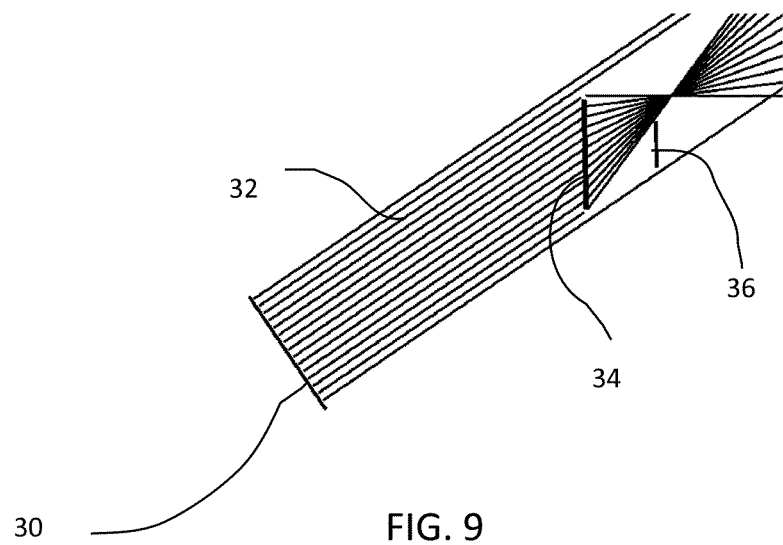
FIG. 9, in a schematic view, illustrates results of a ray tracing optic simulation with a source of parallel rays deviated by a lens with the rays forming a relatively large angle with the optical axis of the lens.
Figure 10:
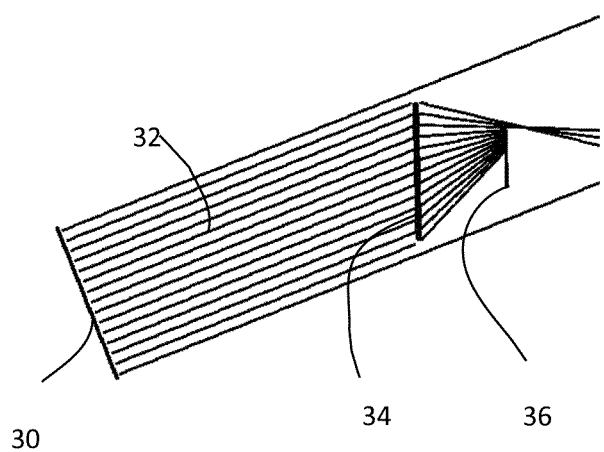
FIG. 10, in a schematic view, illustrates results of a ray tracing optic simulation with a source of parallel rays deviated by a lens with the rays forming a relatively small angle with the optical axis of the lens.

FIGS. 9 and 10 further illustrate how the controller 16" works through ray optics simulation. In FIG. 9, a source 30 of parallel rays 32 shines on an ideal lens 34, which deflects the rays 32. The lens 34 is between the source 30 and a detector 36, which represented the photovoltaic cell 22 for example. The source 30 represents the sun 11, as the latter is so far away from the earth that rays incoming from the sun 11 on any human-scale object can be considered parallel to each other. The lens 34 and the detector 36 are parallel to each other, and the detector 36 is located short of the focal distance of the lens 34. The detector 36 is narrower than the lens 34. At a relatively large angle between the perpendicular to the lens 34 and the rays 32, the rays are deflected so that they all clear the detector 36. When the source 30 gets closer to parallel to the lens, at least some of the rays 32 reach the detector 36, as seen in FIG. 10. In some embodiments, the sensitivity of the controller 16, 16' or 16" is such that when the sunglasses are gradually tilted towards the sun, the transmittance is reduced by a factor of 2 or more over a change in orientation of less than 5 degrees.

Figure 11:
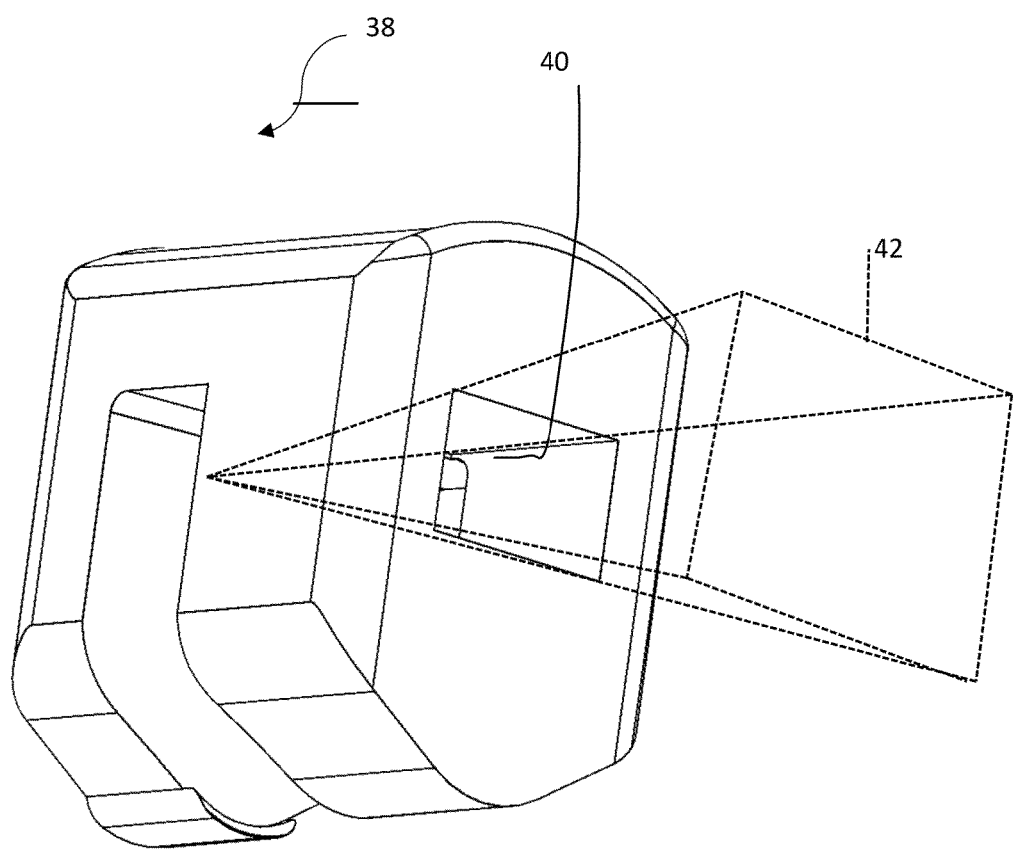
FIG. 11, in a perspective view, illustrates a removable clip usable as a shade in sunglasses similar to the sunglasses of FIGS. 3, 5 and 7

In some embodiments, the shades 26 or 26' or the lens 26" may be selectively removable from the frame 12, for example by being clipped thereto or removably adhered thereto using a weak adhesive, so as to customize the sun-to-sight angle 18 at which the sunglasses lenses 14 darken. Indeed, shades 26 or 26' with different width-to-depth ratios or lenses 26" with different focal lengths may be provided, so that these sunglasses lenses 14 darken with minimal different sun-to-sight angles 18. An example of a clip 38 that can be removably clipped to the bridge of the frame 12 is shown in FIG. 11. The clip 38 is insertable on top of the bridge of a frame similar to the frame 12, but from which the shade 26 has been omitted. In such a frame, the photovoltaic cell 22 is relative close to the front surface of the frame. The clip 38 and defines a passageway 40 configured so that the passageway 40 is in register with the photovoltaic cell 22 when the clip 38 is operationally mounted to the frame 12.

The admittance solid angle 42 of the clip 38 is represented in dashed lines, and represents the range of angles over which rays can reach the center of the passageway 40 at is deepest end. For example, the admittance solid angle is from about 0.03 to about 0.37 steradians, but other values are within the scope of the invention. The admittance solid angle is a minor portion of a field of view of the intended user.

In yet other embodiments, shades 26 or 26' or lenses 26" that are not axisymmetric may be provided, so that the controller 16 presents an anisotropy allowing to treat differently up/down and left/right sun-to-sight angles 18. In yet other embodiments, the shades 26 or 26' or the lens 26" are provided with an attenuating layer for attenuating the light reaching the photovoltaic cell 22. In such cases, only bright sunlight will result in darkening of the sunglasses lenses 14.

In other embodiments, the controller 16 includes accelerometers and/or a compass that can determine an orientation of the sunglasses 10 relative to the sun. If the controller is fed with time, date, longitude and latitude information, the controller 16 can determine the exact position of the sun in the sky and calculate the sun-to-sight angle 18. Then, the controller may control the absorption of the lenses 14 as a function of the sun-to-sight angle 18.

In use, the intended user 15 wears the sunglasses 10 in a conventional manner. When the intended user 15 looks far away from the sun 11, the sunglasses lenses 14 are in their most transmitting state, or at least only slightly darker than this most transmitting state. As the intended user 15 moves his head so that the sunglasses 15 face closer to the sun, the lenses 14 automatically darken once the sun-to-sight angle 18 is small enough. This may happen at any suitable angle, for example at a predetermined angle between 10 and 45 degrees. This sun-to-sight angle that cause darkening is such that tracking the object becomes difficult due to glare from the sun at such an angle. Once the intended user 15 again moves his head, but away from the sun 11, the sunglasses lenses automatically revert to their least absorbing state.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole.

What is claimed is:

1. Sunglasses wearable by an intended user in presence of the sun, the sunglasses comprising:
    a lens support wearable by the intended user and defining a sight direction relative thereto;
    a pair of sunglasses lenses mounted to the lens support, the sunglasses lenses having an adjustable transmittance and being selectively configurable between least and most transmitting states, wherein the sunglasses lenses transmit more visible light in the most transmitting state than in the least transmitting state; and
    a controller operatively coupled to the sunglasses lenses for selectively changing the transmittance, the controller being operative for changing the transmittance as a function of a sun-to-sight angle between the sun and the sight direction, the controller including a light detector and a light processing component, the light processing component being operative for only allowing light incoming over a predetermined admittance solid angle to reach the light detector, the controller being operative for darkening the sunglasses lenses when an irradiance of light reaching the light detector is above a predetermined irradiance;
    wherein the light processing component includes a shade extending away from the light detector in a direction leading towards the sight direction for preventing light rays coming from the sight direction outside of the predetermined admittance solid angle from reaching the light detector.

2. The sunglasses as defined in claim 1, wherein the light detector includes a photovoltaic cell.

3. The sunglasses as defined in claim 2, wherein the sunglasses lenses include one of a liquid crystal film and an electrochromic material, the one of the liquid crystal film and electrochromic material darkening when a voltage is applied thereacross by the photovoltaic cell.

4. The sunglasses as defined in claim 2, wherein the controller is powered by the photovoltaic cell.

5. The sunglasses as defined in claim 1, wherein the shade is removably mounted to the lens support.

6. The sunglasses as defined in claim 1, wherein the predetermined admittance solid angle measures from about 0.03 to about 0.37 steradians.

7. The sunglasses as defined in claim 1, wherein the lens support is a frame supporting the sunglasses lenses.

8. The sunglasses as defined in in claim 1, wherein when the sunglasses are gradually tilted towards the sun, the transmittance is reduced by a factor of 2 or more over a change in orientation of less than 5 degrees.

9. Sunglasses wearable by an intended user in presence of the sun, the sunglasses comprising:
- a lens support wearable by the intended user and defining a sight direction relative thereto;
- a pair of sunglasses lenses mounted to the lens support, the sunglasses lenses having an adjustable transmittance and being selectively configurable between least and most transmitting states, wherein the sunglasses lenses transmit more visible light in the most transmitting state than in the least transmitting state; and
- a controller operatively coupled to the sunglasses lenses for selectively changing the transmittance, the controller being operative for changing the transmittance as a function of a sun-to-sight angle between the sun and the sight direction wherein
  - the controller includes a light detector and a light processing component, the light processing component being operative for only allowing light incoming over a predetermined admittance solid angle to reach the light detector, the predetermined admittance solid angle measuring from about 0.03 to about 0.37 steradians; and
  - the controller is operative for darkening the sunglasses lenses when an irradiance of light reaching the light detector is above a predetermined irradiance.

10. Sunglasses wearable by an intended user in presence of the sun, the sunglasses comprising:
- a lens support wearable by the intended user and defining a sight direction relative thereto;
- a pair of sunglasses lenses mounted to the lens support, the sunglasses lenses having an adjustable transmittance and being selectively configurable between least and most transmitting states, wherein the sunglasses lenses transmit more visible light in the most transmitting state than in the least transmitting state; and
- a controller operatively coupled to the sunglasses lenses for selectively changing the transmittance, the controller being operative for changing the transmittance as a function of a sun-to-sight angle between the sun and the sight direction;
- wherein when the sunglasses are gradually tilted towards the sun, the transmittance is reduced by a factor of 2 or more over a change in orientation of less than 5 degrees.

* * * * *